Dec. 1, 1959  R. B. BRADSTOCK ET AL  2,915,707
CURRENT MEASURING REACTOR ARRANGEMENT
Filed May 17, 1957

Inventors:
Robert B. Bradstock,
William B. Zelina,
by David P. Ogden
Their Attorney.

United States Patent Office 2,915,707
Patented Dec. 1, 1959

2,915,707
CURRENT MEASURING REACTOR ARRANGEMENT

Robert B. Bradstock and William B. Zelina, Erie, Pa., assignors to General Electric Company, a corporation of New York Application May 17, 1957, Serial No. 659,836

9 Claims. (Cl. 324—127)

Our invention relates to a current sensing reactor and, more particularly, to a current sensing reactor which is insensitive to ambient electromagnetic fields.

For many years, industry has recognized a toroidal reactor placed around a current carrying wire as one means of detecting the current flow within the wire. This method is particularly adapted to determine current flow in a bus bar of high current capacity. Because of the positioning of the bus bars adjacent to other bus bars, motors or magnetic windings, it is often necessary to shield these current sensing reactors which normally would be sensitive to stray electromagnetic fields. Such shielding material for bus bars is usually conductive and, therefore, hazardous in high voltage and high power equipment. Also, a large shielded reactor arrangement is inherently expensive to install, maintain, and energize and often, because of its size, requires additional space for the bus bar arrangement.

Therefore, an object of our invention is to provide a small, inexpensive and reliable current measuring reactor arrangement that is insensitive to ambient fields.

In carrying out our invention in one of its modifications, a high current capacity bus bar is deformed to provide an axial aperture, and the current sensing reactor toroidal coils are placed within the expanded portion of the bus bar. A shunt adapted to carry a small, preselected percentage of the current of the bus bar system spans the aperture and passes through the current sensing reactor. The bus bar itself, being expanded in a symmetrical arrangement around the reactor, produces magnetic fields which effectively cancel each other in the region occupied by the reactor and do not affect the flux within the reactor. Also, the conductor material and the strong fields in the main portion of the bus bar substantially eliminate any effect of ambient magnetic fields produced by adjacent bus bars or other equipment.

The subject matter which we regard as our invention is particularly pointed out and distinctly claimed in the concluding portion of this specification. Our invention, however, as to its organization and method of operation together with further objects and advantages thereof will best be understood by reference to the following description taken in connection with the following drawing, in which:

Figure 1:
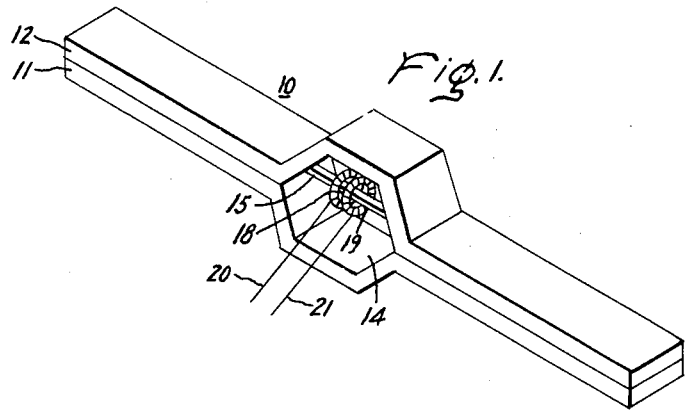
Fig. 1 shows one embodiment of our invention.

Referring now to the drawing, in which like numerals refer to similar parts, in Fig. 1, we have shown a bus bar 10 composed of two separate and similar conductors 11 and 12. These two conductors are formed to provide a shielding recess or aperture 14 at some point along the axis of the bus bar 10.

Our invention will operate satisfactorily in a less symmetrical aperture as long as a null in the magnetic fields produced by the current in the conductors 11 and 12 is readily determinable. However, in order to simplify construction and the following discussion, we prefer to have an arrangement symmetrical with the axis of the aperture 14 in the same plane as and perpendicular to the axis of the bus bar 10. Across the aperture 14, a relatively small current capacity shunt 15 is connected along a null of the magnetic fields to shunt a portion of the current of the bus bar 10. Thus, the shunt 15 lies in the plane determined by the axes of the aperture 14 and the bus bar 10 and carries current proportional to the larger current in the bus bar 10.

Because of the effect of variable ambient temperatures on the resistance of conductors, we prefer to have the conductors 11 and 12 and the shunt 15 made of the same material.

Figure 4:
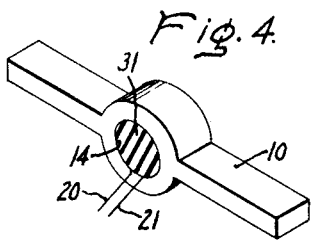
Fig. 4 shows a modification of our invention.

The toroidal current measuring reactor coils 18 and 19 are positioned to sense current in the shunt 15. We prefer to have the reactor coils 18 and 19 connected through the lead wires 20 and 21 to a sensing means such as a control arrangement shown in Fig. 2. Thus, current flow within the shunt 15 will influence the conductivity of the coils 18 and 19, and provide the desired control or indication of current. The placing of these coils 18 and 19 is critical in that their axes should be at the null of the magnetic fields produced by the conductors 11 and 12. When the deformation on aperture 14 is cylindrical as shown in Fig. 4, or symmetrical as shown in Fig. 1, this null lies in a plane defined by the intersecting axes of the aperture 14 and the bus bar 10. We have found that by placing the shunt 15 in this plane and the coils 18 and 19 tightly on the shunt, desired balance is obtained.

Figure 2:
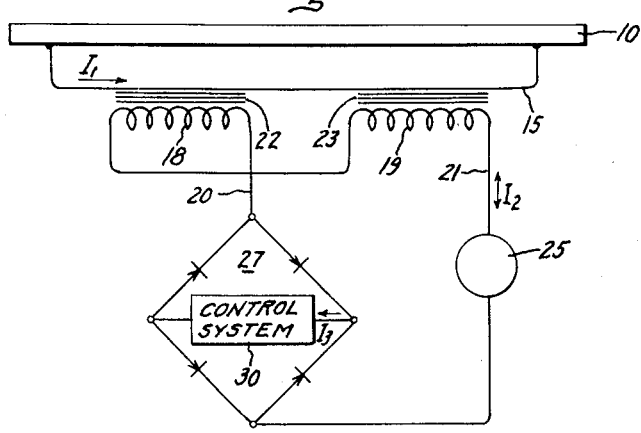
Fig. 2 shows a schematic circuit arrangement for electrically connecting the reactor coils of the Fig. 1 in a control circuit.

In Fig. 2, we have shown schematically the current measuring reactor coils 18 and 19 wound on magnetic cores 22 and 23 positioned to be influenced by a unidirectional current $I_1$ in the shunt 15. Usually the current measuring reactor cores 22 and 23 and coils 18 and 19 are designed to provide a maximum impedance to an alternating current $I_2$ from a source shown as a generator 25. When current does pass through this impedance, the alternating current flow may be rectified by a bridge rectifier 27 to provide a signal $I_3$ for a control system 30. Under the influence of the current $I_2$, the magnetic properties of the cores 22 and 23 are selected to remain slightly below saturation and substantially prevent flow of the current $I_2$ to the bridge rectifier 27 as long as there is no current flow in the main bus bar 10 and its shunt 15. Obviously, when the cores 22 and 23 are saturated the impedance of coils 18 and 19 is materially reduced, and a signal current $I_3$ will flow. Also, the coils 18 and 19 are wound so that any current $I_1$ in the shunt 15 will oppose the flux excursion in one core and assist it in the other during alternate half cycles.

However, as the current $I_1$ increases in the shunt 15, each of the reactor cores 22 and 23 is saturated by this current $I_1$. During alternate half cycles, the alternating current $I_2$ will increase the flux density of one core, thus driving it further into saturation and drive the other core out of saturation with alternating current ampere turns equal to the direct current being measured after which no further increase in alternating current is experienced since the remainder of the alternating current supply voltage will be absorbed by the unsaturated core. The following half cycle will allow only the same alternating current ampere-turns ($I_2N$) except now the other core will be driven out of saturation. It is apparent then, excluding the small value of exciting ampere-turns required to swing the flux in the respective core, that the alternating current ampere turns will be equal to the direct current amperes (since one direct current turn is used). Hence, $I_2N=I_1$ or $I_2=I_1/N$.

It is also clear that a single core 18 would provide a half cycle during which the $I_1$ and $I_2$ were additive to provide a minimum impedance with the flux caused by $I_1$ and $I_2$ opposing during the other half cycle. Thus, a signal would result when $I_1$ and $I_2$ were opposing. For many purposes, this great a variation in signal would suffice. However, with the small coils of our invention and the similarly small cost, we prefer to use two opposing reactor coils as shown in the drawing, for most applications.

Figure 3:
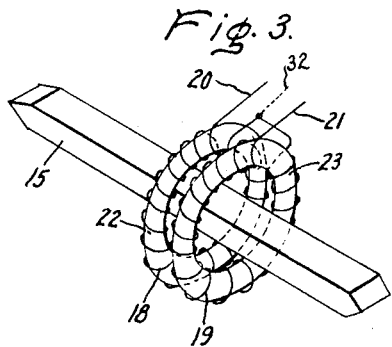
Fig. 3 is an enlarged view of the reactor and the current shunt passing through the reactor as shown in Fig. 1.

Fig. 3 shows more clearly the physical arrangement of the cores 22 and 23 on the shunt 15 and the arrangement of the windings 18 and 19 on the cores 22 and 23. It should be noted that this is a usual arrangement of current measuring reactors if we neglect the advantages of our invention of having most of the current shunted and the physical and electrical shielding provided by the bus bar 10.

Our invention as shown in Fig. 1 combines in a very simple and new manner the shielding effect and the measuring of a shunt wire current instead of the total current in the bus bars. This immediately provides several surprising advantages. The magnetic fields produced by the conductors 11 and 12 do not affect the reactor impedance. The reactor coils are small and require a very small power source. Also, there is no longer a need for external or additional shielding from ambient magnetic fields and very little extra insulation is required on the bus bar 10 to protect the expanded portion. Nor is there any likelihood of the slightly expanded portion of the bus bar 10 allowing or causing a short circuit between adjacent bus bars.

With our invention, the magnetic fields within the aperture 14 which are produced by the two main portions 11 and 12 of the bus bar 10, since the currents are parallel, will be equal and opposite. As long as the shunt lies in the plane where the magnetic fields cancel, and the cores 22 and 23 are coaxial therewith, the fields cancel out exactly in the region of the cores 22 and 23. Since the bus bar fields are very close to the cores 23 and 24, it is clear that they will prevent any influence from ambient fields.

In one particular application of our invention, the bus bar 10 is adapted to carry as much as 5500 amperes of unidirectional current. Obviously, any construction of a current measuring reactor which would measure properly this amount of current will require several pounds of magnetizable material. Our smaller toroidal coils operate on approximately one percent of the total current or 55 amperes for this particular application.

Thus, the entire arrangement is easier to use, smaller and less expensive than similiar devices used in the past.

In the modification shown in Fig. 4, in order to strengthen the entire arrangement, when the coils are properly positioned, we prefer that the aperture 14 be filled with an insulation material 31 such as an epoxy resin which will solidify. Also, in Fig. 4, we have shown a one-piece bus bar 10 which is enlarged at a point along its axis to provide the aperture 14.

While we have shown and described particular embodiments of our invention, other modifications will occur to those skilled in the art. For instance, a single core would be adequate for a current transformer on some applications. Such as application might be valuble when the bus bar 10 is designed to carry alternating current to cause a measurable alternating current or voltage output from the coil 18 with the coil leads 20 and 32 (Fig. 3) connected to interpretive equipment (not shown). We desire it to be understood, therefore, that we intend the following claims to cover all such modifications as fall within the true spirit and scope of our invention.

What we claim as new and desire to secure by Letters Patent of the United States is:

1. A reactor arrangement comprising a conductor provided with an aperture, a conductive shunt spanning said aperture and adapted to carry current proportional to a current in said conductor, a magnetizable core surrounding said shunt to be influenced magnetically by current flow therethrough, a coil wound on said core whereby current flow in said shunt influences any current flow in said coil.

2. A current measuring reactor arrangement comprising a conductor provided with an axial lateral expanded portion, a conductive shunt spanning said portion substantially parallel to the longitudinal axis of said conductor and adapted to carry a current proportional to a current in said conductor, said shunt lying in the null of the magnetic fields produced by current flow around said portion in said conductor, a current measuring reactor core coaxially surrounding said shunt to be influenced magnetically solely by current flow therethrough, a coil wound on said core whereby current flow in said shunt causes magnetic flux variation in said core to influence current flow in said coil, and means connected to said coil for interpreting the variation of magnetic flux in said core.

3. A current measuring reactor arrangement comprising a conductor provided with an axial lateral aperture, a conductive shunt spanning said aperture substantially parallel to the longitudinal axis of said conductor and adapted to carry a current proportional to a current in said conductor, said shunt lying in a plane defining the null of the magnetic fields produced by current flow around said aperture in said conductor, a current measuring reactor core coaxially surrounding said shunt to be influenced magnetically by current flow therethrough, and a coil wound on said core adapted to be energized by alternating current to cause flux excursions therein which will substantially saturate said core, whereby current flow in said shunt causes said core to become saturated during alternate half cycles of said alternating current.

4. A current measuring reactor arrangement comprising a conductor provided with an axial lateral aperture, a conductive shunt spanning said aperture coaxially with the longitudinal axis of said conductor and adapted to carry a current proportional to a current in said conductor, a pair of current measuring reactor cores surrounding said shunt to be influenced magnetically by current flow therethrough, and coils wound on said cores adapted to be energized by alternating current to cause flux excursions in said cores which will substantially saturate said cores whereby current flow in said shunt causes each of said cores to be saturated during alternate half cycles of said alternating current, said reactor coils and cores being adapted to substantially prevent flow of alternating current until they are saturated, whereby current flow through said coils indicates current flow in said shunt.

5. A current measuring reactor arrangement comprising a conductor provided with an axial lateral aperture, a conductive shunt spanning said aperture along the null in the magnetic fields produced by the current passing around said aperture, said shunt being adapted to carry a unidirectional current proportional to a unidirectional current in said conductor, a pair of current measuring reactor cores surrounding said shunt to be influenced magnetically by current flow therethrough, coils wound on said cores and connected to be energized by alternating current causing flux excursions therein which will substantially saturate said cores whereby current flow in said shunt causes each of said cores to be saturated during portions of alternate half cycles of said alternating current, and an encapsulating resin substantially filling said aperture and securing said coils and cores coaxially with respect to said shunt, said reactor coils and cores being adapted to substantially prevent flow of alternating current until they are saturated, whereby current flow therein indicates current flow in said shunt.

6. A current measuring reactor arrangement comprising a pair of similar conductors secured together and deformed to provide a symmetrical axial transverse aperture, a conductive shunt spanning said aperture and adapted to carry a current proportional to a unidirectional current in said conductor, a pair of current measuring reactor cores surrounding said shunt to be influenced magnetically by current flow therethrough, said conductors having a width greater than said cores whereby said conductors are adapted to prevent ambient magnetic fields from influencing the flux within said cores, coils wound on said cores adapted to be energized by alternating current to cause flux excursions therein which will substantially saturate said cores whereby current flow in said shunt causes each of said cores to be saturated during portions of alternate half cycles of said alternating current, said reactor coils and cores being adapted to substantially prevent flow of alternating current until they are saturated, at which time current flow therein indicates current flow in said shunt, and an encapsulating material filling said aperture to support securely said cores and said shunt therein.

7. A current measuring reactor arrangement comprising a pair of similar conductors deformed and secured together to provide a symmetrical axial transverse aperture, the axis of said aperture being perpendicular to and intersecting the longitudinal axis of said pair, said axes defining a null plane where magnetic fields produced by current in said conductors will cancel a conductive shunt spanning said aperture and adapted to carry a current proportional to a current in said conductor, a pair of current measuring reactor cores coaxially surrounding said shunt to be influenced magnetically by current flow therethrough, said shunt lying in said plane whereby said null will bisect said cores, said conductors having a width greater than said cores whereby ambient magnetic fields are prevented from influencing the flux within said cores, coils wound on each of said cores in an opposite sense and adapted to be energized by alternating current to cause flux excursions therein which will substantially saturate said cores whereby current flow in said shunt causes one of said cores to be saturated during each alternate half cycle of said alternating current flow, said reactor coils and cores being adapted to substantially prevent flow of said alternating current until said cores are saturated, at which time current flow in said coils is proportional to current flow in said shunt, and an encapsulating material filling said aperture to support said cores and said shunt in the desired coaxial location.

8. A current measuring reactor arrangement comprising a pair of similar conductors deformed and secured together with a symmetrical axial transverse aperture, a conductive shunt spanning said aperture coaxially with said pair and adapted to carry a current proportional to current theerof, said conductors and said shunt being of compatible material to prevent physical strain or relative variation in conductivity with variation in temperatures, a pair of current measuring reactor cores surrounding said shunt to be influenced magnetically solely by current flow therethrough, said conductors having a width greater than said cores to prevent ambient magnetic field from influencing the flux within said cores, and coils wound on said cores adapted to be energized by alternating current to cause flux excursions therein which will substantially saturate said cores whereby current flow in said shunt causes each of said cores to be saturated alternately during alternate half cycles of said alternating current, said reactor coils and cores being adapted to substantially reduce flow of alternating current until they are saturated, whereby appreciable current flow therein indicates current flow in said shunt.

9. A current measuring reactor arrangement comprising a conductor having an expanded portion defining an axial cavity, a conductive shunt spanning said cavity substantially parallel to the longitudinal axis of said conductor and being adapted to carry a current proportional to a current in said conductor, a current measuring reactor core coaxially surrounding said shunt, and a coil on said core whereby current flow in said shunt will influence any current flow in said coil.

References Cited in the file of this patent
UNITED STATES PATENTS

| 2,345,160 | Stephenson | Mar. 28, 1944 |
| 2,480,265 | Rubenstein | Aug. 30, 1949 |

OTHER REFERENCES

"Transductors," by W. Derr et al., in the March issue 1954, of Electrical Manufacturing, pages 136–141.